United States Patent [19]
Sudo

[11] Patent Number: 5,887,195
[45] Date of Patent: Mar. 23, 1999

[54] BUS ARBITRATION BETWEEN AN I/O DEVICE AND PROCESSOR FOR MEMORY ACCESS USING FIFO BUFFER WITH QUEUE HOLDING BUS ACCESS FLAG BIT

[75] Inventor: Hirofumi Sudo, Tokyo, Japan

[73] Assignee: NEC Corporation, Tokyo, Japan

[21] Appl. No.: 562,078

[22] Filed: Dec. 8, 1995

[30]     Foreign Application Priority Data

Dec. 9, 1994   [JP]   Japan ................................. 6-306573

[51] Int. Cl.⁶ .................................................... G06F 13/18
[52] U.S. Cl. .......................... 395/860; 395/292; 395/298
[58] Field of Search .................................. 395/737, 860, 395/862, 863, 291, 292, 298, 305

[56]                References Cited

U.S. PATENT DOCUMENTS

| | | | |
|---|---|---|---|
| 4,281,381 | 7/1981 | Ahuja et al. ............................ | 395/291 |
| 4,473,880 | 9/1984 | Budde et al. ............................ | 395/292 |
| 4,602,327 | 7/1986 | LaViolette et al. ..................... | 395/287 |
| 4,703,420 | 10/1987 | Irwin ...................................... | 395/299 |
| 4,987,529 | 1/1991 | Craft et al. .............................. | 395/293 |
| 5,485,586 | 1/1996 | Brash et al. ............................. | 395/292 |

FOREIGN PATENT DOCUMENTS

| | | |
|---|---|---|
| 62-202253 | 9/1987 | Japan . |
| 63-147252 | 6/1988 | Japan . |
| 1200461 | 8/1989 | Japan . |
| 2144652 | 6/1990 | Japan . |
| 4333950 | 11/1992 | Japan . |

*Primary Examiner*—Richard L. Ellis
*Attorney, Agent, or Firm*—Sughrue, Mion, Zinn, Macpeak & Seas, PLLC

[57]                ABSTRACT

In an information processing system comprising an input/output device, a main memory device, a processing device including a first-in first-out type write-in buffer, and a bus connecting thereamong, the first-in first-out type write-in buffer comprises a flag bit holding area for holding a bus release request signal from the input/output device as a flag bit to produce the flag bit as a flag signal. The bus arbitration circuit determines the bus available right so as to grant a priority right for data write-in processing by the input/output device rather than data write-in processing by the processing device when the bus arbitration circuit receives the flag signal. The bus arbitration circuit determines the bus available right on the basis of the bus release request and the flag signal.

3 Claims, 4 Drawing Sheets

BUS ARBITRATION BETWEEN AN I/O DEVICE AND PROCESSOR FOR MEMORY ACCESS USING FIFO BUFFER WITH QUEUE HOLDING BUS ACCESS FLAG BIT

BACKGROUND OF THE INVENTION

This invention relates to an information processing system comprising an input/output device, a main memory device, and a processing device including a first-in first-out type write-in buffer and, more particularly, to a bus arbitration method between the processing device and the input/output device.

Various bus arbitration methods for information processing systems are already proposed. For example, a bus arbitration method is disclosed in Japanese Unexamined Patent Prepublication of Kôkai No. Hei 4-333,950, namely, 333,950/1992 having the title of invention "INFORMATION PROCESSING SYSTEM". According to Kôkai No. Hei 4-333,950, an information processing system for realizing a bus arbitration method comprises a processing device, a bus arbitration circuit, an input/output device, a main memory device, and a bus. The processing device comprises a central processing unit and a first-in first-out type write-in buffer therein. The main memory device stores a plurality of instructions and data. The main memory device includes a memory array. The central processing unit carries out data processing in accordance with the instructions on the main memory device. The first-in first-out type write-in buffer successively holds write-in addresses and data from the central processing unit to successively supply held addresses and data to the bus. The input/output device is operable at a relatively lower processing rate than that of the processing device. When the input/output device would like to use the bus, the input/output device delivers a bus release request signal to the bus arbitration circuit. The bus arbitration circuit arbitrates between the processing device and the input/output device to determine a bus available right for either the processing device or the input/output device. The bus arbitration circuit delivers first and second enable signals to the processing device and the input/output device, respectively, one at a time. The bus connects between the processing device, the input/output device, and the main memory device.

Recently, the central processing unit is operable at a high operation rate which is several times a transfer rate of the bus. As a result, in a conventional bus arbitration method, continuous write-in processing on addresses and data occurs for the main memory device by the first-in first-out type write-in buffer. Accordingly, the conventional bus arbitration method is disadvantageous in that data write-in processing for the main memory device cannot be carried out by the input/output device during occurrence of the continuous write-in processing on the addresses and data for the main memory device by the first-in first-out type write-in buffer.

In addition, it is impossible to perform data write-in processing by the input/output device although a data write-in request for the input/output device occurs during data write-in processing by the processing device. This is because the data write-in processing by the processing device is carried out continuously. As a result, it is impossible to carry out data write-in processing for the main memory device in the order in which data write-in requests occur in the central processing unit and the input/output device. Accordingly, replacement of the order occurs in the data write-in processing.

Other bus arbitration methods are known. For example, Japanese Unexamined Patent Prepublication of Kôkai No. Hei 2-144,652, namely, 144,652/1990 proposes a bus arbitration system which rationalizes the arbitration of bus available right by changing bus acquisition priority in accordance with data volume stored at present in a first-in first-out (FIFO) storage device to apply the bus available right. Japanese Unexamined Patent Prepublication of Kôkai No. Hei 1-200,461, namely, 200,461/1989 discloses an arbitration system using FIFO type memory which ensures the satisfactory arbitration of a system where resources are shared by a plurality of processes or processors by using a simple constitution using an FIFO type memory and a data driver. Japanese Unexamined Patent Prepublication of Kôkai No. Shô 63-147,252, namely, 147,252/1988 discloses a multiprocessor system which omits the need to decide the priority of interruptions by arbitrating a common bus line when a slave processor board gives an interruption request to a master processor board. Japanese Unexamined Patent Prepublication of Kôkai No. Shô 62-202,253, namely, 202, 253/1987 discloses a memory access shared control system which eliminate the need of extending a DMAC by sending an access permitting signal to an input/output device when the DMAC does not set flag information through control information set in an information setting part by a data signal and a data write clock signal from a processor.

However, each of the above-mentioned Japanese Unexamined Patent Prepublications neither disclose nor suggest technique which provides for data write-in processing by an input/output device while a processing device carries out continuous data write-in processing. In addition, each of the above-mentioned Japanese Unexamined Patent Prepublications neither disclose nor suggest technique which is capable of carrying out the data write-in processing for a main memory device in the order in which data write-in requests occur.

SUMMARY OF THE INVENTION

It is therefore an object of this invention to provide an information processing system and a bus arbitration method which enables data write-in processing by an input/output device while an processing device carries out continuous data write-in processing.

It is another object of this invention to provide an information processing system and a bus arbitration method of the type described, which is capable of carrying out data write-in processing for a main memory device in the order in which data write-in requests for the main memory device occur in the processing device and the input/output device.

Other objects of this invention will become clear as the description proceeds.

According to the invention, the information processing system comprises a bus. Connected to the bus, a main memory device stores a plurality of instructions and data. Connected to the bus, a processing device includes a central processing unit for carrying out data processing on the data in accordance with the instructions stored in the main memory device and a first-in first-out type write-in buffer for successively holding access data from the central processing unit as held access data to supply the held access data to the bus. Connected to the bus, an input/output device is operable at a relatively lower processing rate than that of the processing device. The input/output device produces a bus release request signal. Connected to the processing device and the input/output device, a bus arbitration circuit arbitrates between the processing device and the input/output device to determine a bus available right for either the processing device or the input/output device.

According to this invention, in the above-understood information processing system, the first-in first-out type write-in buffer comprises a flag bit holding area for holding the bus release request signal from the input/output device as a flag bit to produce the flag bit as a flag signal. The bus arbitration circuit thereby determines the bus available right so as to grant a priority right for data write-in processing by the input/output device rather than data write-in processing by the processing device when the bus arbitration circuit receives the flag signal.

According to the invention, the method carries out bus arbitration for an information processing system comprising a bus. Connected to the bus, a main memory device stores a plurality of instructions and data. Connected to the bus, a processing device includes a central processing unit for carrying out data processing in accordance with the instructions on the main memory device and a first-in first-out type write-in buffer for successively holding access data from the central processing unit to successively produce held access data. Connected to the bus, an input/output device is operable at a relatively lower rate than that of the processing device. The input/output device produces a bus release request signal. Connected to the processing device and the input/output device, a bus arbitration circuit arbitrates between the processing device and the input/output device to determine a bus available right for either the processing device or the input/output device.

According to this invention, the above-understood method comprises the steps of: holding the bus release request signal from the input/output device in a flag bit holding area of the first-in first-out type write-in buffer as a flag bit to produce the flag bit as a flag signal; and determining the bus available right so as to grant a priority right for data write-in processing by the input/output device rather than data write-in processing by the processing device when the bus arbitration circuit receives the flag signal.

DESCRIPTION OF THE PREFERRED EMBODIMENT

Figure 1:
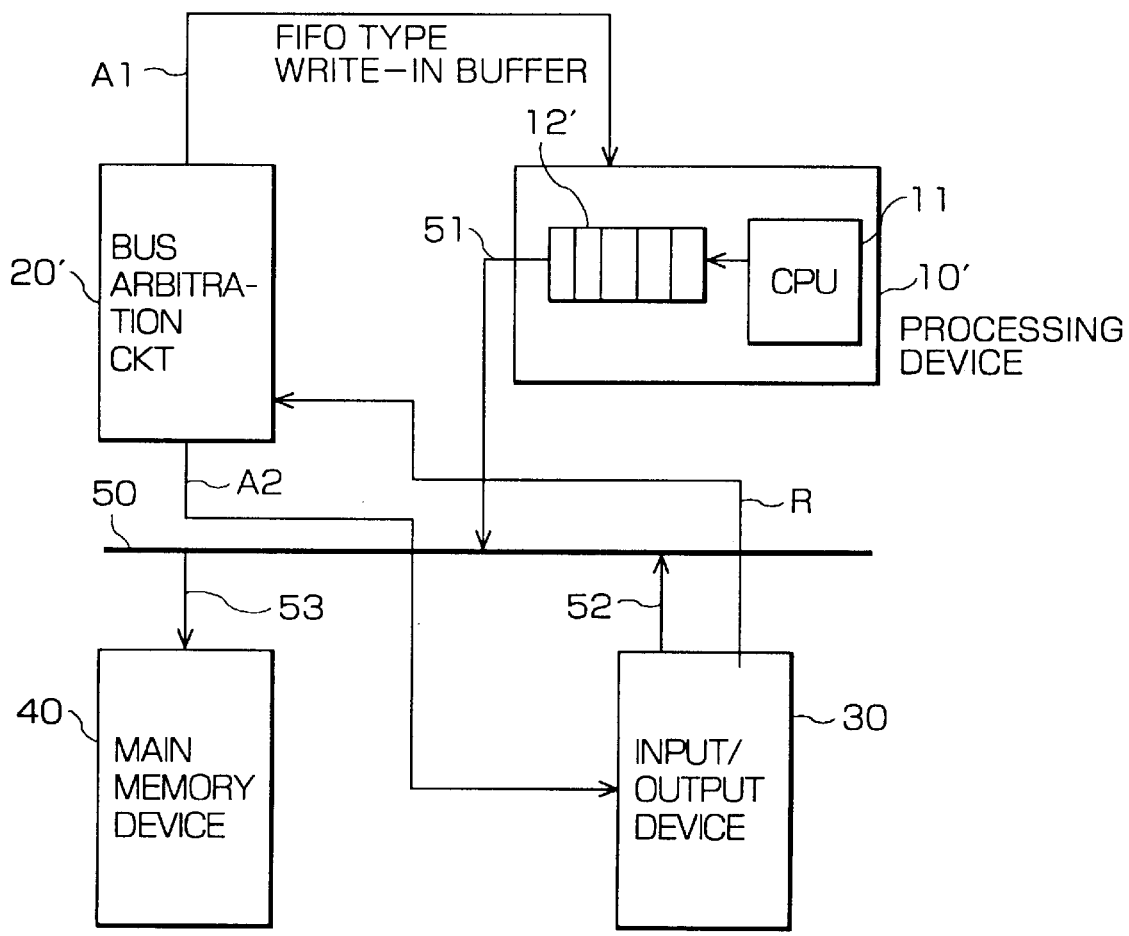
FIG. 1 is a block diagram of a conventional information system.

Referring to FIG. 1, a conventional information processing system will be described in order to facilitate an understanding of this invention. The illustrated information processing system has been proposed, for example, in the above-mentioned Japanese Unexamined Patent Prepublication of Kôkai No. Hei 4-333,950, namely, 333,950/1992.

The information processing system comprises a processing device 10', a bus arbitration circuit 20', an input/output device 30, a main memory device 40, and a bus 50. The processing device 10' comprises a central processing unit (CPU) 11 and a first-in first-out (FIFO) type write-in buffer 12'. The main memory device 40 stores a plurality of instructions and data. The main memory device 40 includes a memory array (not shown). The central processing unit 11 carries out data processing in accordance with the instructions on the main memory device 40. The first-in first-out type write-in buffer 12' successively holds write-in addresses and data from the central processing unit 11 to successively supply held addresses and data to the bus 50.

The input/output device 30 is operable at a relatively lower processing rate than that of the processing device 10'. When the input/output device 30 would like to use the bus 50, the input/output device 30 delivers a bus release request signal R to the bus arbitration circuit 20'. Responsive to the bus release request signal R, the bus arbitration circuit 20' arbitrates between the processing device 10' and the input/output device 30 to determine a bus available right for either the processing device 10' or the input/output device 30. The bus arbitration circuit 20' delivers first and second enable signals A1 and A2 to the processing device 10' and the input/output device 30, respectively, one at a time.

The bus 50 connects between the processing device 10', the input/output device 30, and the main memory device 40. More specifically, the processing device 10' and the bus 50 are connected to one another via a first signal line 51. The input/output device 30 and the bus 50 are connected to one another via a second signal line 52. The main memory device 40 and the bus 50 are connected to one another via a third signal line 53.

The processing device 10' supplies the bus 50 with addresses and data (which are collectively called as access data hereinunder) via the first signal line 51 to write the access data in the main memory device 40 via the third signal line 53. Similarly, the input/output device 30 supplies access data to the bus 50 via the second signal line 52 to write the access data in the main memory device 40 via the third signal line 53.

In this event, a train of access data stored in the first-in first-out type write-in buffer 12' is continuously delivered to the main memory device 40 at one arbitration operation. This is because the bus 50 is occupied for the entire time that the access data are written in the main memory device 40 by the processing device 10'. In the main memory device 40, the continuously received train of access data is decomposed one block by one block to write those blocks in the memory array therein.

Figure 2:
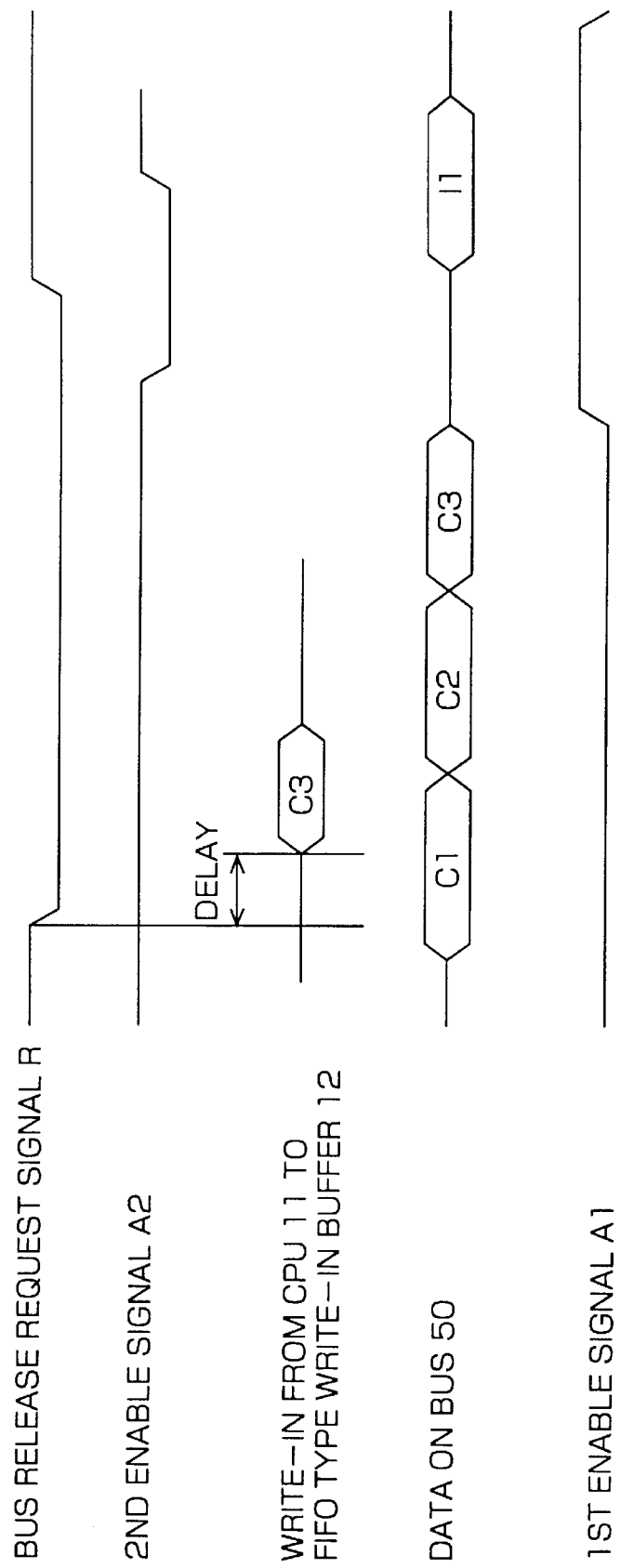
FIG. 2 is a time chart for use in describing a bus arbitration method for the conventional information system illustrated in FIG. 1.

Turning to FIG. 2, description will be directed to a bus arbitration method for the conventional information processing system illustrated in FIG. 1. It is assumed as follows. Each of the bus release request signal R and the first and the second enable signals A1 and A2 is active low. In addition, first and second access data blocks C1 and C2 are already stored in the first-in first-out type write-in buffer 12'. In this state, the input/output device 30 delivers the bus release request signal R to the bus arbitration circuit 20' in the manner depicted along a first or top line in FIG. 2 and then after with a time delay slightly, write-in processing on a third access data block C3 is carried out for the first-in first-out type write-in buffer 12' by the central processing device 11 in the manner depicted along a third line from the top.

Under the circumstances, the first through the third access data blocks C1 to C3 are stored in the first-in first-out type write-in buffer 12'. Inasmuch as the first and the second access data blocks C1 and C2 are already stored in the first-in first-out type write-in buffer 12' before the bus release request signal R is delivered to the bus arbitration circuit 20', the bus arbitration circuit 20' delivers the first enable signal A1 of a logic low level to the processing device 10' to grant the bus available right for the processing device 10' in the manner depicted along a fifth or bottom line.

As a result, the first and the second access data blocks C1 and C2 stored in the first-in first-out type write-in buffer 12' are successively supplied to the main memory device 40 via the first signal line 51, the bus 50, and the third signal line 53 in the manner depicted along a fourth line from the top. As describe above, the train of the access data stored in the first-in first-out type write-in buffer 12' is continuously supplied to the main memory device 40 at one arbitrating operation. Inasmuch as, at this time, the third access data block C3 is already stored in the first-in first-out type write-in buffer 12', the third access data block C3 is also supplied to the main memory device 40 following second access data block C2.

Accordingly, although the bus release request signal R is delivered to the bus arbitration circuit 20' before the third access data block C3 is stored in the first-in first-out type write-in buffer 12', the bus release request signal R is refused by the bus arbitration circuit 20' and it therefore results in occurring replacement of the order. After write-in processing of the first through the third access data blocks C1 to C3 by the processing device 10' (the first-in first-out type write-in buffer 12') to the main memory device 40 comes to end, the bus arbitration circuit 20' receives the bus release request signal R, then stops delivery of the first enable signal A1, and thereafter delivers the second enable signal A2 of the logic low level to the input/output device 30 to grant the bus available right for the input/output device 30. Responsive to the second enable signal A2, the input/output device 30 writes an access data block I1 in the main memory device 40 via the second signal line 52, the bus 50, and the third signal line 53.

Inasmuch as the bus release request signal R is received by the bus arbitration circuit 20', the input/output device 30 stops delivery of the bus release request signal R.

With this structure, in the above-mentioned conventional bus arbitration method, continuous write-in processing for addresses and data occurs for the main memory device 40 by the first-in first-out type write-in buffer 12'. Accordingly, no write-in processing of data can be carried out by the input/output device 30 to the main memory device 40 during the above-mentioned continuous write-in processing. In addition, it is impossible to perform data write-in processing by the input/output device 30 during data write-in processing by the processing device 10'. Accordingly, write-in processing of data for the main memory device 40 cannot be carried out in the order in which data write-in requests occur in the central processing unit 11 and the input/output device 30 and it results in occurring replacement of the order of data write-in processing, as described herein before in the instant specification.

Figure 3:
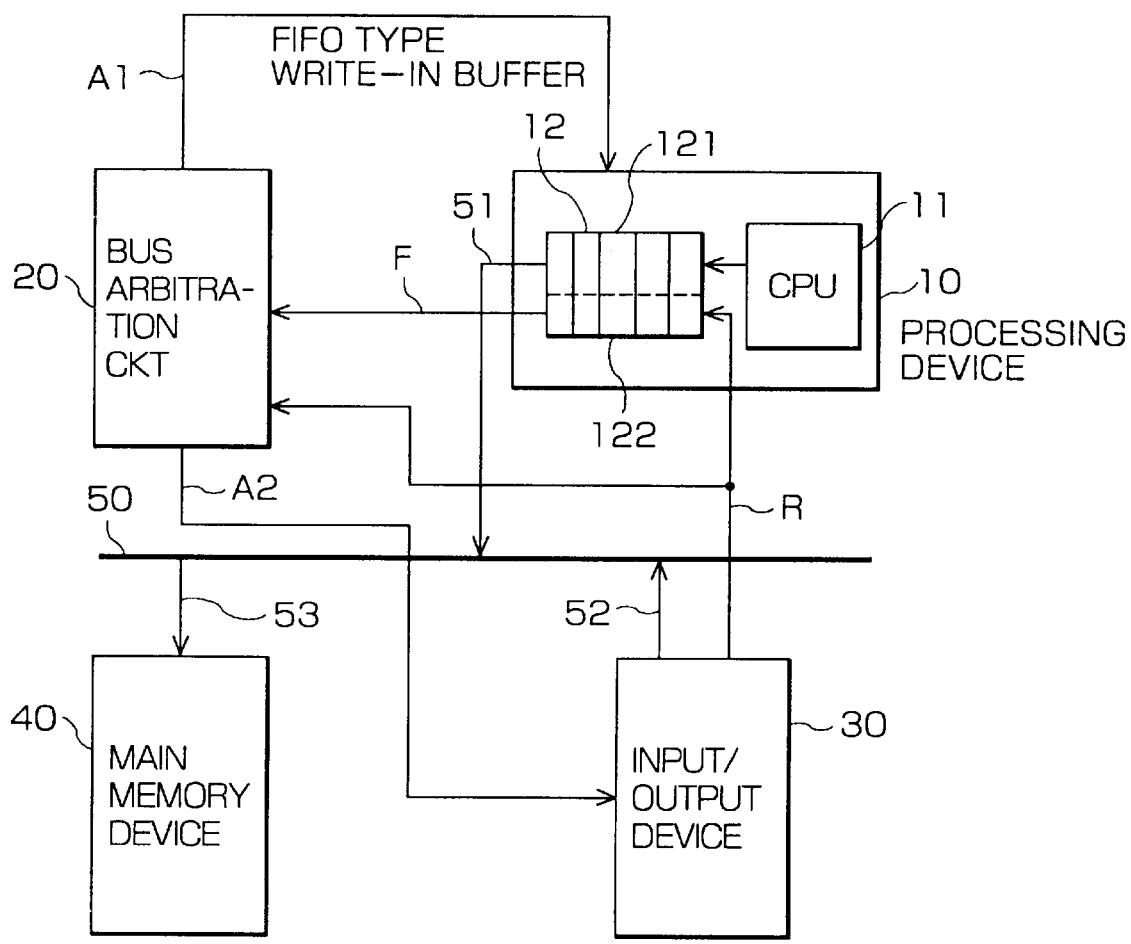
FIG. 3 is a block diagram of an information processing system according to a preferred embodiment of this invention.

Referring to FIG. 3, description will proceed to an information processing system according to a preferred embodiment of this invention. The information processing system is similar in structure to that in FIG. 1 except that the processing device and the bus arbitration circuit are modified to be different from those described in conjunction with FIG. 1 as will later become clear. The processing device and the bus arbitration circuit are therefore depicted at 10 and 20, respectively. The information processing system includes similar circuit portions designated by the same reference numerals as in FIG. 1. That is, the input/output device 30, the main memory device 40, and the bus 50 are similar to those in FIG. 1, and description thereto is therefore omitted.

The processing device 10 includes the central processing unit 11 and a first-in first-out type write-in buffer 12. In the manner which will become clear as the description proceeds, the first-in first-out type write-in buffer 12 is different from the first-in first-out type write-in buffer 12' illustrated in FIG. 1. That is, the first-in first-out type write-in buffer 12' stores the access data from the central processing unit 11 alone while the first-in first-out type write-in buffer 12 stores not only the access data from the central processing unit 11 but also the bus release request signal R from the input/output device 30 as a flag bit. In other words, the first-in first-out type write-in buffer 12 consists of a data holding area 121 for holding the access data and a flag bit holding area 122 for holding the flag bit as a held flag bit. The flag bit holding area 122 produces the held flag bit as a flag signal F. The flag signal F indicates that the train of access data stored in the first-in first-out type write-in buffer 12 is a train of access data written in the first-in first-out type write-in buffer 12 at the same time that the bus release request signal R is produced by the input/output device 30.

The flag signal F is supplied to the bus arbitration circuit 20. When a value of the flag signal F changes, the bus arbitration circuit 20 stops delivery of the first enable signal A1 for the processing device 10 to interrupt continuous access by the processing device 10 thereby making the processing device 10 release the bus 50.

It is assumed that the bus release request signal is supplied from the input/output device 30 to the bus arbitration circuit 20 on the way while data write-in processing is carried out by the central processing unit 11 to the first-in first-out type write-in buffer 12 at a predetermined time interval. Under the circumstances, the train of access data is flagged in the first-in first-out type write-in buffer 12. The access data are successively delivered from the first-in first-out type write-in buffer 12 to the main memory device 40 via the first signal line 51, the bus 50, and the third signal line 53. When the flagged access data is produced, the processing device 10 stops production of the access data by the first-in first-out type write-in buffer 12 to release the bus 50.

The bus arbitration circuit 20 is receives both the bus release request signal R from the input/output device 30 and the flag signal F from the flag bit holding area 122 of the first-in first-out type write-in buffer 12. In the manner which will later be described, the bus arbitration circuit 20 determines the bus available right on the basis of the bus release request signal R and the flag signal F. That is, the bus arbitration circuit 20 usually grants the bus available right for the processing device 10. But the bus arbitration circuit 20 grants the bus available right for the input/output device 30 when the bus arbitration circuit 20 receives the bus release request signal R. More specifically, when the flag signal F from the processing device 10 (the first-in first-out type write-in buffer 12) is valid and when the bus arbitration circuit 20 receives the bus release request signal R, the bus arbitration circuit 20 grants the bus available right for the input/output device 30. As a result, it is possible to perform the data write-in request for the input/output device 30 during data write-in processing by the processing device 10.

Figure 4:
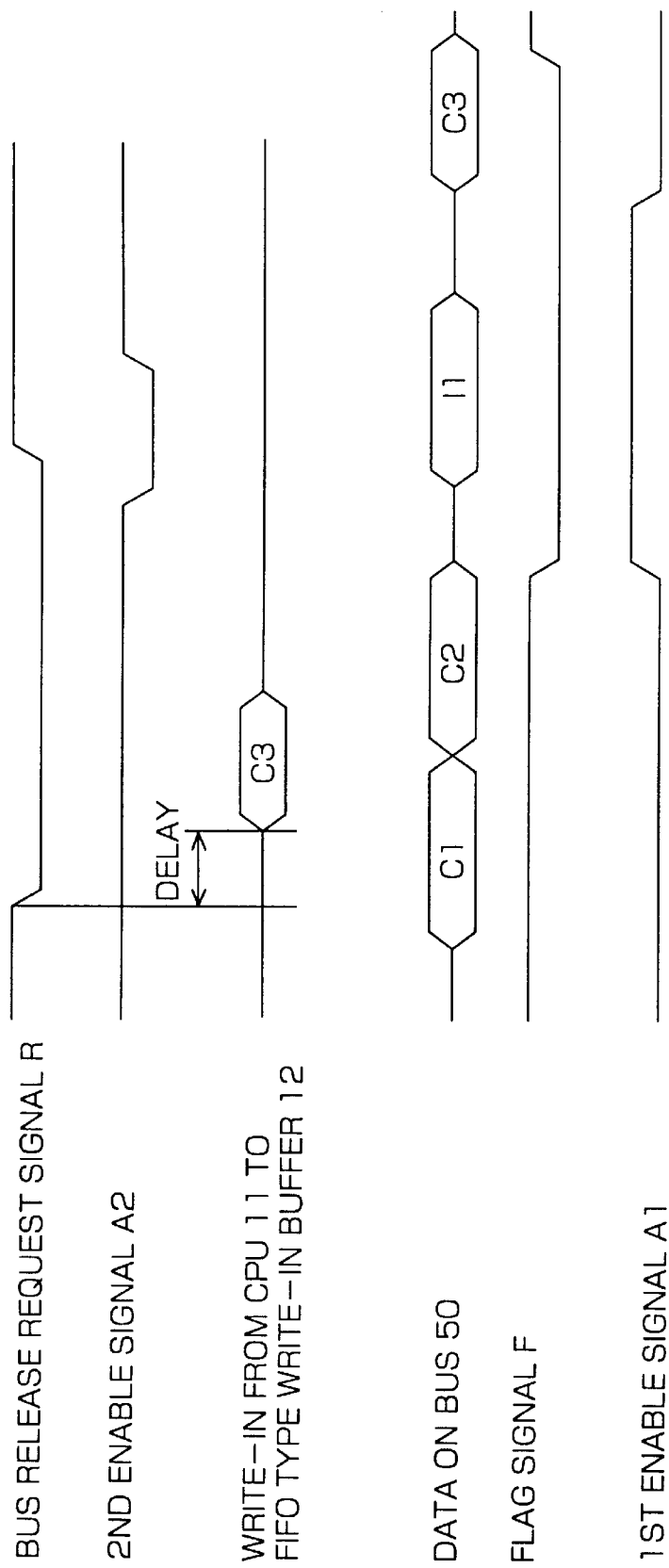
FIG. 4 is a time chart for use in describing a bus arbitration method for the information system illustrated in FIG. 3.

Turning to FIG. 4, description will be directed to a bus arbitration method for the information processing system illustrated in FIG. 3. It is assumed as follows. Each of the bus release request signal R and the first and the second enable signals A1 and A2 is active low. In addition, in the similar manner described in conjunction with FIG. 3, first and second access data blocks C1 and C2 are already stored in the first-in first-out type write-in buffer 12. In this state, the input/output device 30 delivers the bus release request signal R to the bus arbitration circuit 20 in the manner depicted along a first or top line in FIG. 4 and then after with a time delay slightly, write-in processing of a third access data block C3 is carried out for the first-in first-out type write-in buffer 12 by the central processing device 11 in the manner depicted along a third line from the top.

Under the circumstances, the first through the third access data blocks C1 to C3 are held in the data holding area 121 of the first-in first-out type write-in buffer 12 and the bus release request signal R is held in the flag bit holding area 122 of the first-in first-out type write-in buffer 12 as the flag bit. In the example being illustrated, the flag bit is set in the third access data block D3. Inasmuch as the first and the second access data blocks C1 and C2 are already held in the data holding ares 121 of the first-in first-out type write-in buffer 12 before the bus release request signal R is delivered to the bus arbitration circuit 20, the bus arbitration circuit 20 delivers the first enable signal A1 of the logic low level to the processing device 10 to grant the bus available right for the processing device 10 in the manner depicted along a sixth or bottom line.

As a result, the first and the second access data blocks C1 and C2 held in the data holding area 121 of the first-in first-out type write-in buffer 12 are successively supplied to the main memory device 40 via the first signal line 51, the bus 50, and the third signal line 53 in the manner depicted along a fourth line from the top. Thereafter, the flag signal F is delivered from the flag bit holding area 122 of the first-in first-out type write-in buffer 12 to the bus arbitration circuit 20 in the manner depicted along a fifth line from the top. Responsive to the flag signal F, the bus arbitration circuit 20 stops delivery of the first enable signal A1 to make the processing device 10 release the bus 50. In addition, inasmuch as the flag signal F from the processing device 20 is valid (the logic low level) and the bus arbitration circuit 20 receives the bus release request signal R, the bus arbitration circuit 20 delivers the second enable signal A2 of the logic low level to the input/output device 30 to grant the bus available right for the input/output device 30. Responsive to the second enable signal A2, the input/output device 30 writes an access data block I1 in the main memory device 40 via the second signal line 52, the bus 50, and the third signal line 53.

Inasmuch as the bus release request signal R is received by the bus arbitration circuit 20, the input/output device 30 stops delivery of the bus release request signal R. When the bus arbitration circuit 20 does not receive the bus release request signal R, the bus arbitration circuit 20 stops delivery of the second enable signal A2. Inasmuch as the bus release request signal R is not received although the flag signal F is valid, the bus arbitration circuit 20 delivers the first enable signal A1 of the logic low level to the processing device 10 to grant the bus available right for the processing device 10. Responsive to the first enable signal A1, the third access data block C3 held in the data holding area 121 of the first-in first-out type write-in buffer 12 is supplied to the main memory device 40 via the first signal line 51, the bus 50, and the third signal line 53.

As described above, it is possible to perform the data write-in request due to the bus release request signal R of the input/output device 30 during write-in processing of data by the processing device 10. In addition, it is possible to carry out data write-in processing for the main memory device 40 in the order in which the data write-in requests for the main memory device 40 occur in the central processing unit 11 and the input/output device 30.

While this invention has thus far been described in conjunction with only one preferred embodiment thereof, it will now readily be possible for one skilled in the art to develop various other embodiments this invention.

What is claimed is:

1. An information processing system comprising:

a bus;

a main memory device, connected to said bus, for storing a plurality of instructions and data;

a processing device, connected to said bus, including a central processing unit for carrying out data processing on the data in accordance with the instructions stored in said main memory device and a first-in first-out (FIFO) write-in buffer for successively holding access data from said central processing unit as held access data to supply the held access data to said bus;

an input/output device, connected to said bus, being operable at a relatively lower processing rate than that of said processing device, said input/output device producing a bus release request signal to request bus access; and a bus arbitration circuit, connected to said processing device and said input/output device, for arbitrating between said processing device and said input/output device to determine a bus available right for either said processing device or said input/output device, said FIFO write-in buffer comprising a flag bit holding area for holding the bus release request signal from said input/output device as a flag bit to produce a flag signal, whereby said bus arbitration circuit determines the bus available right so as to grant a priority right for data write-in processing by said input/output device rather than data write-in processing by said processing device when said bus arbitration circuit receives the flag signal from said FIFO write-in buffer of said processing device and the bus release request from said input/output device while said processing device is carrying out continuous data write-in processing.

2. A method of carrying out bus arbitration for an information processing system comprising a bus; a main memory device, connected to said bus, for storing a plurality of instructions and data; a processing device, connected to said bus, including a central processing unit for carrying out data processing in accordance with the instructions on said main memory device and a first-in first-out FIFO write-in buffer for successively holding access data from said central processing unit to successively produce held access data; an input/output device, connected to said bus, being operable at a relatively lower rate than that of said processing device, said input/output device producing a bus release request signal; and a bus arbitration circuit, connected to said processing device and said input/output device, for arbitrating between said processing device and said input/output device to determine a bus available right for either said processing device or said input/output device, said method comprising the steps of:

holding the bus release request signal from said input/output device in a flag bit holding area of said FIFO write-in buffer as a flag bit to produce a flag signal;

and determining said bus available right so as to grant a priority right for data write-in processing by said input/output device rather than data write-in processing by said processing device when said bus arbitration circuit receives the flag signal from said FIFO write-in buffer and the bus release request from said input/output device while said processing device is carrying out continuous data write-in processing.

3. A method of carrying out bus arbitration for an information processing system comprising a bus; a processing device, connected to said bus, including a central processing unit and a first-in first-out (FIFO) write-in buffer; an input/output device, connected to said bus, producing a bus release request signal; and a bus arbitration circuit, connected to said processing device and said input/output device, for determining a bus available right for either said processing device or said input/output device, said method comprising the steps of:

holding the bus release request signal from said input/output device in a flag bit holding area of said FIFO write-in buffer as a flag bit to produce a flag signal;

and determining said bus available right so as to grant a priority right for data write-in processing by said input/output device rather than data write-in processing by said processing device when said bus arbitration circuit receives the flag signal from said FIFO type write-in buffer and the bus release request signal while said processing device is carrying out continuous data write-in processing.

* * * * *